(12) United States Patent
Li et al.

(10) Patent No.: US 10,529,095 B2
(45) Date of Patent: Jan. 7, 2020

(54) RECONSTRUCTING DUAL-ENERGY CT IMAGES

(71) Applicant: Shenyang Neusoft Medical Systems Co., Ltd., Shenyang (CN)

(72) Inventors: Shuangxue Li, Shenyang (CN); Shanshan Lou, Shenyang (CN); Lixia Tong, Shenyang (CN)

(*) Notice: Subject to any disclaimer, the term of this patent is extended or adjusted under 35 U.S.C. 154(b) by 133 days.

(21) Appl. No.: 15/871,131

(22) Filed: Jan. 15, 2018

(65) Prior Publication Data

US 2018/0204357 A1     Jul. 19, 2018

(30) Foreign Application Priority Data

Jan. 16, 2017   (CN) .......................... 2017 1 0033884

(51) Int. Cl.
  *G06T 11/00*   (2006.01)
(52) U.S. Cl.
  CPC .......... *G06T 11/005* (2013.01); *G06T 11/006* (2013.01); *G06T 2207/10081* (2013.01); *G06T 2211/408* (2013.01); *G06T 2211/432* (2013.01); *G06T 2211/436* (2013.01)
(58) Field of Classification Search
  None
  See application file for complete search history.

(56) References Cited

U.S. PATENT DOCUMENTS

| | | | | |
|---|---|---|---|---|
| 5,570,403 A | * | 10/1996 | Yamazaki | A61B 6/032 378/19 |
| 8,098,916 B2 | * | 1/2012 | Thielemans | A61B 6/032 382/131 |
| 2008/0187094 A1 | * | 8/2008 | Stodilka | A61B 6/032 378/22 |
| 2010/0104062 A1 | * | 4/2010 | Wu | H01J 35/045 378/19 |
| 2011/0243404 A1 | * | 10/2011 | Li | G06T 11/008 382/128 |
| 2012/0039432 A1 | * | 2/2012 | Kondo | A61B 6/405 378/4 |
| 2014/0072098 A1 | * | 3/2014 | Kappler | A61B 6/032 378/19 |
| 2016/0058404 A1 | * | 3/2016 | Nitta | A61B 6/4241 378/5 |

(Continued)

*Primary Examiner* — Jiangeng Sun
(74) *Attorney, Agent, or Firm* — Kilpatrick Townsend & Stockton, LLP (57) ABSTRACT

Methods and devices for reconstructing dual-energy CT images are provided. In one aspect, CT scan is performed with a high energy and a low energy periodically and alternatively changed on a scanning target, reconstruction data for a high-energy image of a current reconstruction position is obtained based on whether a circle of high-energy scan closest to the current reconstruction position of the scanning target is a full circle of scan, the high-energy image of the current reconstruction position is reconstructed according to the reconstruction data of the high-energy image; reconstruction data for a low-energy image of the current reconstruction position is obtained based on whether a circle of high-energy scan closest to the current reconstruction position of the scanning target is the full circle of scan, the low-energy image of the current reconstruction position is reconstructed according to the reconstruction data of the low-energy image.

14 Claims, 4 Drawing Sheets

(56) References Cited

U.S. PATENT DOCUMENTS

| | | | |
|---|---|---|---|
| 2017/0340304 A1* | 11/2017 | Qiulin | A61B 6/5205 |
| 2018/0025510 A1* | 1/2018 | Chen | A61B 6/03 382/131 |

* cited by examiner

RECONSTRUCTING DUAL-ENERGY CT IMAGES

CROSS REFERENCE TO RELATED APPLICATIONS

This application claims priority to Chinese Patent Application No. 201710033884.4 entitled "Method and Device for Reconstructing Dual-Energy CT Images" filed on Jan. 16, 2017, the entire content of which is incorporated herein by reference.

TECHNICAL FIELD

The present disclosure relates to reconstructing dual-energy Computed Tomography (CT) images.

BACKGROUND

For dual-energy CT, imaging can be performed on a scanning area by using X-rays of two different energies, and composition of the scanning area can be obtained based on a reconstructed image by using a difference of X-ray attenuation between different substances.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

DETAILED DESCRIPTION

Example embodiments will be described below in detail with the examples thereof shown in the accompanying drawings. When the following descriptions involve the drawings, like numerals in different drawings represent like or similar elements unless stated otherwise. The implementations described in the following example embodiments do not represent all implementations consistent with the present disclosure. On the contrary, they are merely examples of a device and a method consistent with some aspects of the present disclosure described in detail in the appended claims.

The terminology used in the present disclosure is for the purpose of describing a particular example only, and is not intended to limit the present disclosure. The singular forms such as "a", "said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

In dual-energy scan, respective data corresponding to different energies can be collected. The data collected in each of the energies is desired to ensure reconstruction of a target image. Thus, the different energies are desired to be switched in the scanning process, and data obtained in each circle of scan is desired to meet the requirements of the image reconstruction.

Figure 1:
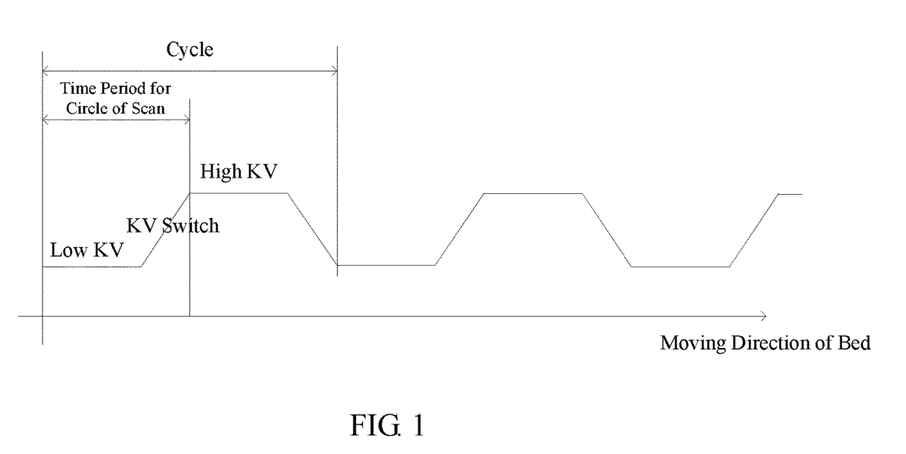
FIG. 1 is a schematic diagram illustrating a set of obtained projection data corresponding to dual-energy scan according to an example of the present disclosure.
Figure 2:
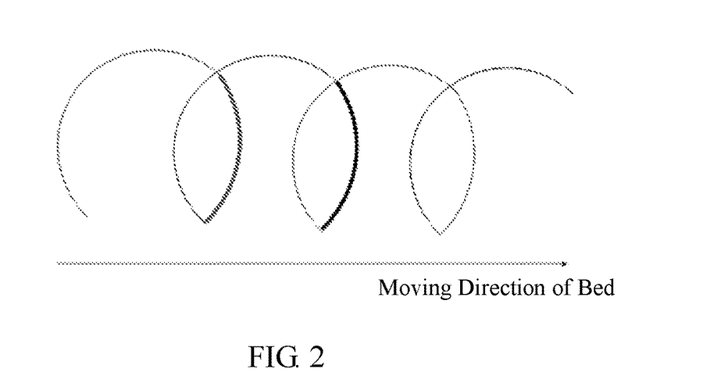
FIG. 2 is a schematic diagram illustrating a dual-energy spiral scan according to an example of the present disclosure.

FIGS. 1 and 2 are schematic diagrams illustrating dual-energy spiral scans. A first circle of scan in FIG. 2 corresponds to a low-energy (e.g., LowKV) scan in FIG. 1, and a second circle of scan in FIG. 2 corresponds to a high-energy (e.g., HighKV) scan in FIG. 1, and so on. A switch time when a circle of low-energy scan and a circle of high-energy scan adjacent with each other are switched may be denoted as KVSwitch. During each circle of scan, a scanning time period corresponding to a plurality of scanning angles may be used to perform switch between the circle of high-energy scan and the circle of low-energy scan. Collected data corresponding to the scanning angles may not be used for the image reconstruction. In FIG. 2, the scanning time period corresponding to a last part of scanning angles for each circle of scan is used for energy switch (expressed by a thick black line), such as the scanning angles corresponding to an overlapping part of a first circle of scan and a second circle of scan, the scanning angles corresponding to an overlapping part of the second circle of the scan and a third circle of the scan, and so on.

In each circle of scan, the amount of the collected scanning data may be equal to the number of views per scan for image reconstruction, which may be denoted as viewPerScan. In a circle of scan, a first energy is switched to a second energy when the number of obtained views reaches viewPerScan. In a next circle of scan, the second energy is switched back to the first energy when the number of obtained views reaches viewPerScan, and so on.

Figure 3:
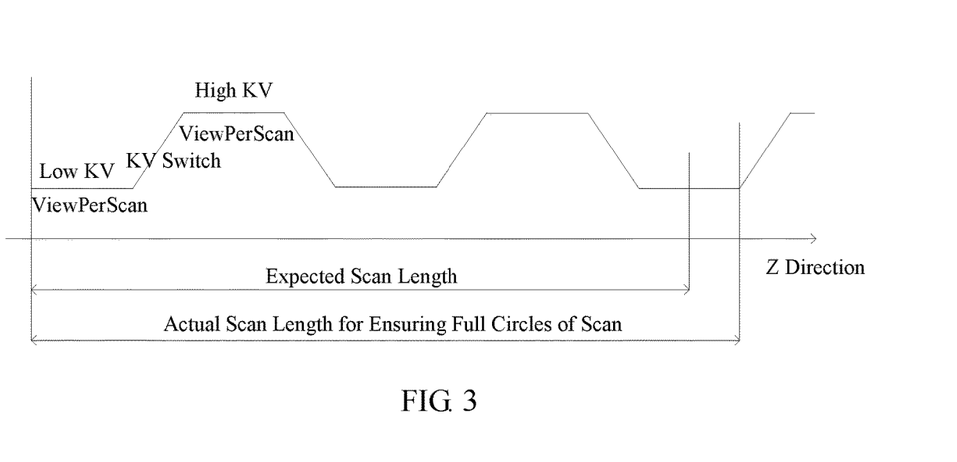
FIG. 3 is a schematic diagram illustrating a set of collected projection data corresponding to a dual-energy scan according to an example of the present disclosure.

In the scanning process, the number of circles of scan corresponding to an expected scanning length of a scanned area may be not an integral. To cover all positions in the scanning target, redundant scan may be performed. In FIG. 3, according to an actual scanning length of the scanning area and a moving distance of each circle of scan in z direction, redundant data scan may be performed, which can cause a patient to be exposed under unnecessary radiation.

In the dual-energy CT scan, to cover all positions in the scanning target to make all the positions meet the requirements for high-energy image reconstruction and low-energy image reconstruction, a scanning length of the CT scan is set to be an integral number of scanning circles. However, a scanning length of an actual scanning target may not be equal to an integral number of circles of scan. Referring to FIG. 3, in this case, redundant scan is performed, which can cause a patient to be exposed under unnecessary radiation.

Figure 4:
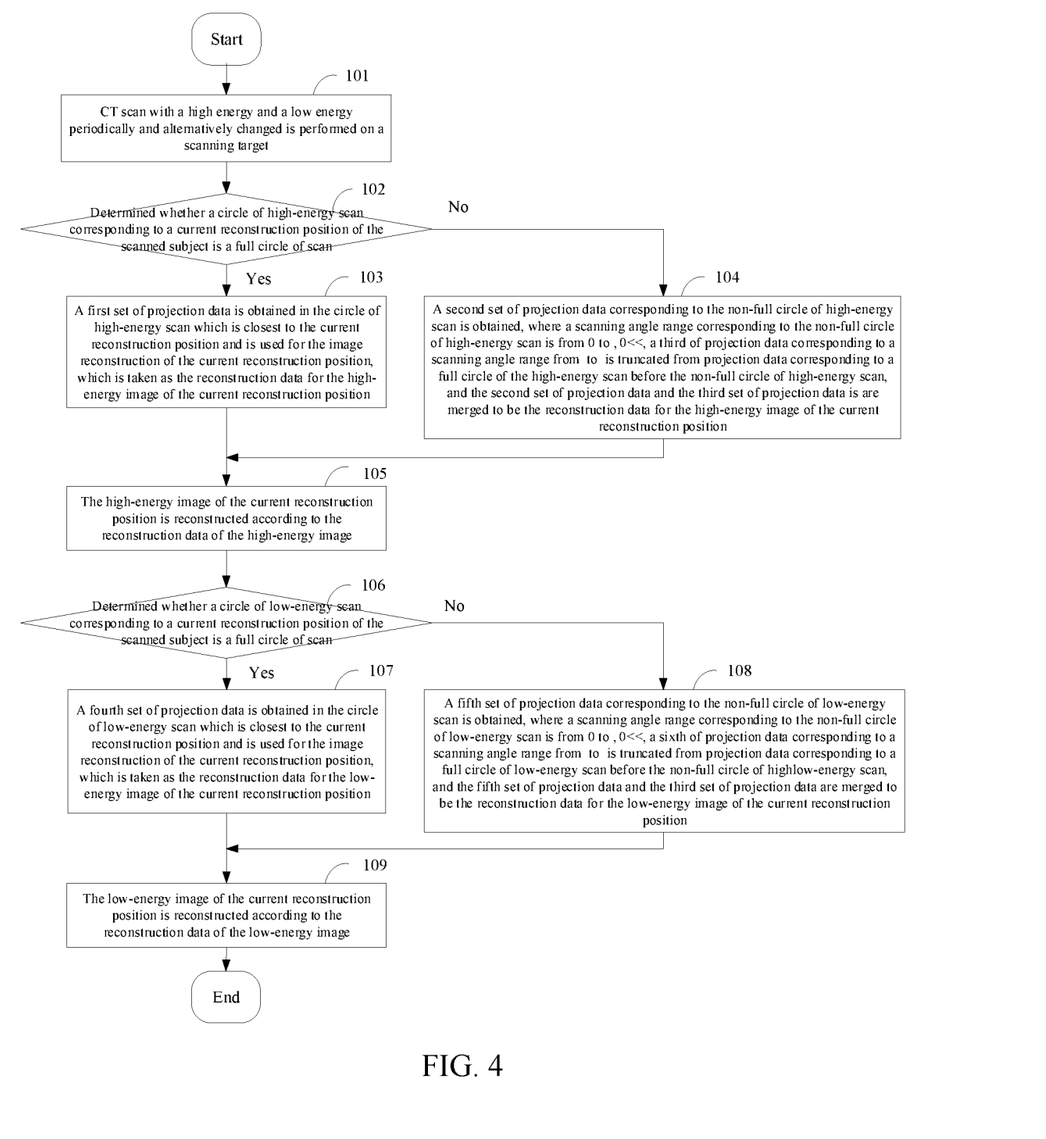
FIG. 4 is a flowchart illustrating a method of reconstructing dual-energy CT images according to an example of the present disclosure.

In FIG. 4, a method of reconstructing dual-energy CT images is provided in an example of the present disclosure, which includes procedures as follows.

At block 101, CT scan with a high energy and a low energy periodically and alternatively changed is performed on a scanning target, where a scanning angle range for each full circle of high-energy scan and a scanning angle range for each full circle of low-energy scan are respectively from 0 to $\theta_{max}$;

In an example, a position of the scanning target on a subject may be determined. After the position of the scanning target is determined on the subject, a scan starting point and a scan finishing point for the scanning target may be set for the scanned target. A set of projection data corresponding to the desired scanning length may be obtained by performing the scan with the high energy and the low energy periodically and alternatively changed. Further, a scanning voltage corresponding to the high-energy scan may be larger than a scanning voltage corresponding to the low-energy scan. A set of projection data corresponding to each circle of high-energy scan may be obtained in the circle of high-energy scan, and a set of projection data area corresponding to each circle of low-energy scan may be obtained in the circle of low-energy scan.

In an example, in the process of obtaining a set of projection data corresponding to the scanning length, there are a plurality of circles of scan with the high energy and a plurality of circles of scan with the low energy to periodically and alternatively obtain respective sets of projection data corresponding to the plurality of circles of scan with the high energy and respective sets of projection data corresponding to the plurality of circles of scan with the low energy.

A last circle of scan may correspond to the high-energy scan or the low-energy scan, which depends on the scanning length, the scanning energy corresponding to the scan starting point and a scanning angle range of each full circle. Moreover, each circle of scan before the last circle of scan is a full circle of scan. The last circle of scan may be a full circle of scan or a non-full circle of scan. Whether the last circle of scan is the full circle of scan is related with the scanning length and the scanning angle range of each full circle.

In an example, an initial angle of a full circle of scan with each of the energies (e.g., the high energy and the low energy) may be 0, and a maximum scanning angle of a full circle of scan with each energy may be $\theta_{max}$.

In an example, the CT scan is a spiral scan. An overlapping part of CT spiral scan for adjacent respective circles with two energies (e.g., the high energy and the low energy) is an energy switching area. A set of projection data corresponding to the energy switching area is invalid data. The set of projection data corresponding to the energy switching area may not be used for high-energy image reconstruction, and can also not be used for low-energy image reconstruction.

Further, scanning angle ranges corresponding to different energy switching areas may be same with each other. In an example, a scanning angle range corresponding to the energy switching area from the high energy scan to the low energy scan and a scanning angle range corresponding to the energy switching area from the low-energy scan to the high energy scan may be same with each other.

In an ideal condition, a time period when the switch from the high-energy scan to the low-energy scan is performed and a time period when the switch from the low-energy scan to the high-energy scan may be 0.

A scanning bed for CT scan may respectively move in two moving directions, e.g., a forward direction and a backward direction. The forward direction of the scanning bed is denoted as z direction in the example. During the scan, the moving direction of the scanning bed may be perpendicular to a plane of a gantry, and the CT device may perform the scan on a scanning target in a direction perpendicular to the moving direction of the scanning bed.

At block 102, it is determined whether a circle of high-energy scan corresponding to a current reconstruction position of the scanned subject is a full circle of scan.

In an example, the current reconstruction position corresponds to a point or an area of the scanning target. A set of scanning data for reconstructing the high-energy image of the point or the area at the current reconstruction position may include scanning data obtained by a circle of high-energy scan closest to the current reconstruction position.

In some examples, whether the circle of high-energy scan is the full-circle of scan may be determined according to a maximum scanning angle of the circle of high-energy scan closest to the current reconstruction position on the scanning target.

In an example, a maximum scanning angle corresponding to a circle of high-energy scan closest to the current reconstruction position is obtained. When the maximum scanning angle corresponding to the circle of high-energy scan is equal to $\theta_{max}$, it is determined that the circle of high-energy scan which is closest to the current reconstruction position and is used for the image reconstruction of the current reconstruction position is the full circle of scan. Otherwise, it is determined that the circle of high-energy scan which is closest to the current reconstruction position is used for the image reconstruction for the current reconstruction position is the non-full circle of scan.

In another example, whether the circle of high-energy scan which is closest to the current reconstruction position and is used for the image reconstruction of the current reconstruction position on the scanning target is the full circle of scan may be determined according to the amount of projection data obtained by the circle of high-energy scan.

In an example, the amount of the projection data corresponding to the circle of high-energy scan which is closest to the current reconstruction position and is used for the image reconstruction of the current reconstruction position is determined. When the amount of the projection data corresponding to the circle of high-energy scan is equal to the preset amount of data, it is determined that the circle of high-energy scan which is closest to the current reconstruction position and is used for the image reconstruction of the current reconstruction position is the full circle of scan. When the amount of the projection data corresponding to the circle of high-energy scan is less than the preset amount of data, it is determined that the circle of high-energy scan which is closest to the current reconstruction position and is used for image reconstruction for the current reconstruction position is the non-full circle of scan.

In an example, the preset amount of data may be viewPerS can desired for reconstructing the high-energy image. When the amount of the projection data corresponding to the circle of high-energy scan is equal to viewPerScan, the circle of high-energy scan may be determined to be a full circle of scan. When the amount of the projection data corresponding to the circle of high-energy scan is less than viewPerScan, the circle of high-energy scan may be determined to be the non-full circle of scan.

In an example, the preset amount may be the amount of projection data desired to be obtained in a full circle of scan.

When the circle of high-energy scan which is closest to the current reconstruction position and is used for the image reconstruction of the current reconstruction position is the non-full circle of scan, procedures in block 104 are executed.

In an example, when the circle of high-energy scan which is closest to the current reconstruction position and is used for the image reconstruction of the current reconstruction position is the non-full circle of scan, it is indicated that the circle of high-energy scan which is closest to the current reconstruction position and is used for the image reconstruction of the current reconstruction position is the last circle of scan, and the maximum scanning angle of the circle is smaller than $\theta_{max}$, it is further indicated that the last circle of scan in the scanning length is the non-full circle of scan. When the current reconstruction position is closest to the last circle of scan, an incomplete projection data area of the last circle of scan may not satisfy the requirements of the image reconstruction.

For example, the last circle of scan is the high-energy scan, the current reconstruction position is within a low-energy scanning area, and the circle of high-energy scan closest to the current reconstruction position is the last circle of scan. Since the projection data area of the last circle of scan is incomplete, the amount of the projection data obtained in the last circle of scan may not satisfy the requirements for reconstructing the high-energy image of the current reconstruction position when the high-energy image of the current reconstruction position is reconstructed.

When the circle of high-energy scan which is closest to the current reconstruction position and is used for the image reconstruction of the reconstruction position is the full-circle of scan, e.g., the maximum scanning angle of the circle of high-energy scan which is closest to the current reconstruction position and is used for the image reconstruction of the current reconstruction position is equal to $\theta_{max}$, it is indicated that a complete projection data area for reconstructing the high-energy image is available for the current reconstruction position, and procedures in block 103 is executed.

At block 103, when the circle of high-energy scan which is closest to the current reconstruction position and is used for the image reconstruction of the current reconstruction position is the full-circle of scan, a first set of projection data is obtained in the circle of high-energy scan which is closest to the current reconstruction position and is used for the image reconstruction of the current reconstruction position, which is taken as the reconstruction data for the high-energy image of the current reconstruction position.

When the circle of high-energy scan which is closest to the current reconstruction position and is used for the image reconstruction of the current reconstruction position is the full-circle of scan, e.g., the maximum scanning angle of the circle of high-energy scan which is closest to the current reconstruction position and is used for the image reconstruction of the current reconstruction position is equal to $\theta_{max}$, it is indicated that the amount of projection data in the first set of projection data obtained in the circle of high-energy scan which is closest to the current reconstruction position and is used for the image reconstruction of the current reconstruction position satisfies the requirements for the amount of projection data for reconstructing the high-energy image.

At block 104, when the circle of high-energy scan which is closest to the current reconstruction position and is used for the image reconstruction of the current reconstruction position is the non-full circle of scan, a second set of projection data corresponding to the non-full circle of high-energy scan is obtained, where a scanning angle range corresponding to the non-full circle of high-energy scan is from 0 to $\theta_{high-end}$, $0<\theta_{high-end}<\theta_{max}$, a third of projection data corresponding to a scanning angle range from $\theta_{high-end}$ to $\theta_{max}$ is truncated from projection data corresponding to a full circle of the high-energy scan before the non-full circle of high-energy scan, and the second set of projection data and the third set of projection data are merged to be the reconstruction data for the high-energy image of the current reconstruction position.

In an example, when the circle of scan which is closest to the current reconstruction position and is used for the image reconstruction of the current reconstruction position is the non-full circle of scan, the full circle of scan corresponding to the truncated projection data and the non-full circle of scan are spaced by one full circle of scan, where the scanning energy corresponding to the spaced full circle of scan is different from the scanning energy of the non-full circle of scan. The full-circle of scan corresponding to the truncated projection data and the non-full circle of scan are spaced only by one full circle of scan, and the scanning energy of the spaced full circle of scan is another energy different from the scanning energy of the non-full circle of scan.

In an example, closer the scanning position to the current reconstruction position, greater an association degree between the set of obtained projection data and the reconstruction position, a full circle of scan before the non-full circle of scan is selected as a full circle of scan for truncating the third set of projection data, where the selected full-circle of scan and the non-full circle of scan are spaced by one circle of scan in a way that the reconstructed image can have high accuracy.

For example, when the non-full circle of scan is the high-energy scan, the full circle of scan for truncating the third of projection data may be the high-energy scan, and the circle of high-energy scan corresponding to the truncated third set of projection data and the non-full circle of scan are spaced only by one circle of low-energy scan, so that the reconstructed high-energy image of the current reconstruction position can be more accurate.

In an example, the circle of high-energy scan which is closest to the current reconstruction position and is used for the image reconstruction of the current reconstruction position may be a circle of high-energy scan passing through the current reconstruction position, or a previous or next circle of high-energy scan adjacent to the current circle of scan passing through the reconstruction position.

In an example, a first distance between the current reconstruction position and a finishing position of a previous circle of high-energy scan adjacent to the circle of scan passing through the reconstruction position and a second distance between the current reconstruction position and a starting position of a next circle of high-energy scan adjacent to the circle of scan passing through the current reconstruction position are respectively calculated and compared with each other. The circle of high-energy scan corresponding to a smaller one of the first distance and the second distance is determined to be the circle of the high-energy scan closest to the current reconstruction position.

In an example, when the first distance between the current reconstruction position and the finishing position of the previous circle of high-energy scan adjacent to the circle of scan passing through the reconstruction position is equal to the second distance between the current reconstruction position and the starting position of the next circle of high-energy scan adjacent to the circle of scan passing through the current reconstruction position, an association degree between the set of projection data obtained in the previous circle of high-energy scan and the current reconstruction position is same as an association degree between the set of projection data obtained in the next circle of high-energy scan and the current reconstruction position, thus, one of the previous circle of high-energy scan and the next circle of high-energy scan is selected to be the circle of high-energy scan closest to the current reconstruction position.

At block 105, the high-energy image of the current reconstruction position is reconstructed according to the reconstruction data of the high-energy image.

At block 106, it is determined whether a circle of low-energy scan corresponding to a current reconstruction position of the scanned subject is a full circle of scan.

In some examples, whether the circle of low-energy scan is the full-circle of scan may be determined according to a maximum scanning angle of the circle of low-energy scan closest to the current reconstruction position on the scanning target.

In an example, a maximum scanning angle corresponding to a circle of low-energy scan closest to the current reconstruction position is obtained. When the maximum scanning angle corresponding to the circle of low-energy scan is equal to $\theta_{max}$, it is determined that the circle of low-energy scan which is closest to the current reconstruction position and is used for the image reconstruction of the current reconstruction position is the full circle of scan. Otherwise, it is determined that the circle of low-energy scan which is closest to the current reconstruction position is used for the image reconstruction for the current reconstruction position is the non-full circle of scan.

In another example, whether the circle of low-energy scan which is closest to the current reconstruction position and is used for the image reconstruction of the current reconstruction position on the scanning target is the full circle of scan may be determined according to the amount of projection data obtained by the circle of low-energy scan.

In an example, the amount of the projection data corresponding to the circle of low-energy scan which is closest to the current reconstruction position and is used for the image reconstruction of the current reconstruction position is determined. When the amount of the projection data corresponding to the circle of low-energy scan is equal to the preset amount of data, it is determined that the circle of low-energy scan which is closest to the current reconstruction position and is used for the image reconstruction of the current reconstruction position is the full circle of scan. When the amount of the projection data corresponding to the circle of low-energy scan is less than the preset amount of data, it is determined that the circle of low-energy scan which is closest to the current reconstruction position and is used for image reconstruction for the current reconstruction position is the non-full circle of scan.

In an example, the preset amount of data may be viewPerScan desired for reconstructing the low-energy image. When the amount of the projection data corresponding to the circle of low-energy scan is equal to viewPerScan, the circle of low-energy scan may be determined to be a full circle of scan. When the amount of the projection data corresponding to the circle of low-energy scan is less than viewPerScan, the circle of low-energy scan may be determined to be the non-full circle of scan.

In an example, the preset amount may be the amount of projection data desired to be obtained in a full circle of scan.

When the circle of low-energy scan which is closest to the current reconstruction position and is used for the image reconstruction of the current reconstruction position is the non-full circle of scan, procedures in block 108 are executed.

In an example, when the circle of low-energy scan which is closest to the current reconstruction position and is used for the image reconstruction of the current reconstruction position is the non-full circle of scan, it is indicated that the circle of low-energy scan which is closest to the current reconstruction position and is used for the image reconstruction of the current reconstruction position is the last circle of scan, and the maximum scanning angle of the circle is smaller than $\theta_{max}$, it is further indicated that the last circle of scan in the scanning length is the non-full circle of scan. When the current reconstruction position is closest to the last circle of scan, an incomplete projection data area of the last circle of scan may not satisfy the requirements of the image reconstruction.

When the circle of low-energy scan which is closest to the current reconstruction position and is used for the image reconstruction of the reconstruction position is the full-circle of scan, e.g., the maximum scanning angle of the circle of low-energy scan which is closest to the current reconstruction position and is used for the image reconstruction of the current reconstruction position is equal to $\theta_{max}$, it is indicated that a complete projection data area for reconstructing the low-energy image is available for the current reconstruction position, and procedures in block 107 is executed.

At block 107, when the circle of low-energy scan which is closest to the current reconstruction position and is used for the image reconstruction of the current reconstruction position is the full-circle of scan, a fourth set of projection data is obtained in the circle of low-energy scan which is closest to the current reconstruction position and is used for the image reconstruction of the current reconstruction position, which is taken as the reconstruction data for the low-energy image of the current reconstruction position.

When the circle of low-energy scan which is closest to the current reconstruction position and is used for the image reconstruction of the current reconstruction position is the full-circle of scan, e.g., the maximum scanning angle of the circle of low-energy scan which is closest to the current reconstruction position and is used for the image reconstruction of the current reconstruction position is equal to $\theta_{max}$, it is indicated that the amount of projection data in the first set of projection data obtained in the circle of low-energy scan which is closest to the current reconstruction position and is used for the image reconstruction of the current reconstruction position satisfies the requirements for the amount of projection data for reconstructing the low-energy image.

At block 108, when the circle of low-energy scan which is closest to the current reconstruction position and is used for the image reconstruction of the current reconstruction position is the non-full circle of scan, a fifth set of projection data corresponding to the non-full circle of low-energy scan is obtained, where a scanning angle range corresponding to the non-full circle of low-energy scan is from 0 to $\theta_{low-end}$, $0<\theta_{low-end}<\theta_{max}$, a sixth of projection data corresponding to a scanning angle range from $\theta_{low-end}$ to $\theta_{max}$ is truncated from projection data corresponding to a full circle of low-energy scan before the non-full circle of low-energy scan, and the fifth set of projection data and the third set of projection data are merged to be the reconstruction data for the low-energy image of the current reconstruction position.

In an example, the circle of low-energy scan which is closest to the current reconstruction position and is used for the image reconstruction of the current reconstruction position may be a circle of low-energy scan passing through the current reconstruction position, or a previous or next circle of low-energy scan adjacent to the current circle of scan passing through the reconstruction position.

In an example, a third distance between the current reconstruction position and a finishing position of a previous circle of low-energy scan adjacent to the circle of scan passing through the reconstruction position and a fourth distance between the current reconstruction position and a starting position of a next circle of low-energy scan adjacent to the circle of scan passing through the current reconstruction position are respectively calculated and compared with each other. The circle of low-energy scan corresponding to a smaller one of the first distance and the second distance is determined to be the circle of the low-energy scan closest to the current reconstruction position.

In an example, when the third distance between the current reconstruction position and the finishing position of the previous circle of low-energy scan adjacent to the circle of scan passing through the reconstruction position is equal to the fourth distance between the current reconstruction position and the starting position of the next circle of low-energy scan adjacent to the circle of scan passing through the current reconstruction position, an association degree between the set of projection data obtained in the previous circle of high-energy scan and the current reconstruction position is same as an association degree between the set of projection data obtained in the next circle of low-energy scan and the current reconstruction position, thus, one of the previous circle of low-energy scan and the next circle of low-energy scan is selected to be the circle of high-energy scan closest to the current reconstruction position.

At block 109, the low-energy image of the current reconstruction position is reconstructed according to the reconstruction data of the low-energy image.

Figure 5:
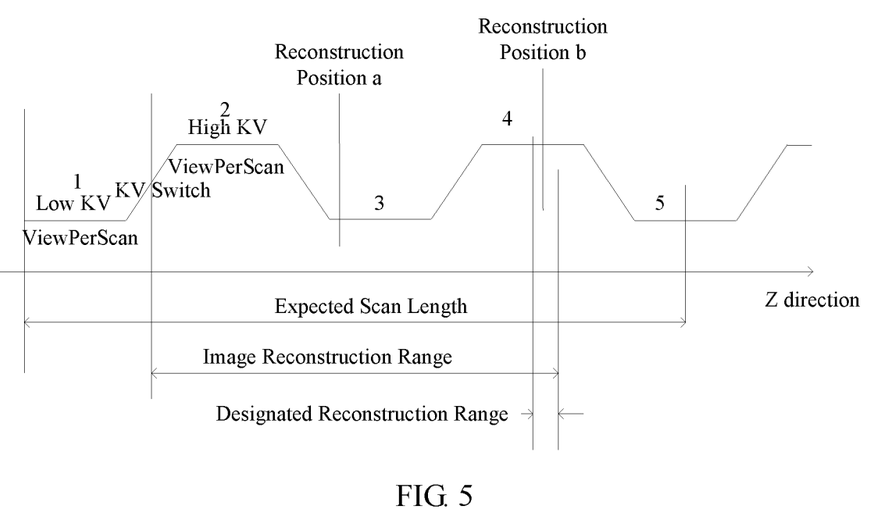
FIG. 5 is a schematic diagram illustrating a set of collected projection data corresponding to a dual-energy CT scan according to an example of the present disclosure.

In an example, a spiral scan may be performed with a high energy and a low energy periodically and alternatively changed on a scanned target to obtain a set of projection data corresponding to a preset scanning length. Referring to FIG. 5, the set of projection data corresponding to the preset scanning length corresponds to energy data areas 1 to 5 in a moving direction (z-direction) of a scanning bed.

Each of the energy data areas 1 to 4 is a full circle of scan (corresponding to a complete radiation range corresponding to scanning angles from 0 to $\theta_{max}$), and energies of scan is alternatively changed from a low energy to a high energy.

The energy data area 5 is a last circle of low-energy CT scan. The last circle of low-energy CT scan is a non-full circle of scan (corresponding to an incomplete radiation range) corresponding to scanning angles from 0 to $\theta_5$, where $0<\theta_5<\theta_{max}$.

When a maximum scanning angle corresponding to a circle of scan with each energy which is closest to a reconstruction position and is used for the image reconstruction of the reconstruction position is equal to $\theta_{max}$, a set of scanning data in a data area corresponding to a circle of high-energy scan closest to the reconstruction position is selected as reconstruction data for a high-energy image of the reconstruction position, and a set of scanning data in a data area corresponding to a circle of low-energy scan closest to the reconstruction position is selected as reconstruction data for a low-energy image of the reconstruction position.

For example, in FIG. 5, when an image is reconstructed for a reconstruction position a in the energy data area 3 and close to the energy data area 2, a set of projection data in the energy data area 3 is selected to reconstruct a low-energy image of the reconstruction position a, and a set of projection data in the energy data area 2 is selected to reconstruct a high-energy image of the reconstruction position a.

When the maximum scanning angle corresponding to a circle of an energy closest to this reconstruction position is smaller than $\theta_{max}$, e.g., a last circle of scan is a circle of scan closest to the reconstruction position, the energy data area 4 may be used to reconstruct a high-energy image of a reconstruction position when the high-energy image corresponding to the reconstruction position is reconstructed. When a low-energy image of the reconstruction position is reconstructed, the low-energy image of the reconstruction position fails to be reconstructed because a set of data corresponding to the energy data area 5 closest to the reconstruction position is incomplete, e.g., a complete low-energy data area may not be obtained for the reconstruction position.

For example, for a reconstruction position b in FIG. 5, a circle of high-energy scan closest to the reconstruction position (the reconstruction position b is at a marking line in FIG. 5) corresponds to the energy data area 4, and a circle of low-energy scan closest to the reconstruction position b corresponds to the energy data area 5, where the energy data area 5 is a non-full circle of scan. When the low-energy image of the reconstruction position b is reconstructed, no complete low-energy image can be reconstructed because the set of projection data corresponding to the energy data area 5 is incomplete.

In an example, a part of a set of projection data corresponding to the energy data area 3 which is close to the energy data area 5 and uses a same scanning energy as that of a circle of scan corresponding to the energy data area 5.

Figure 6:
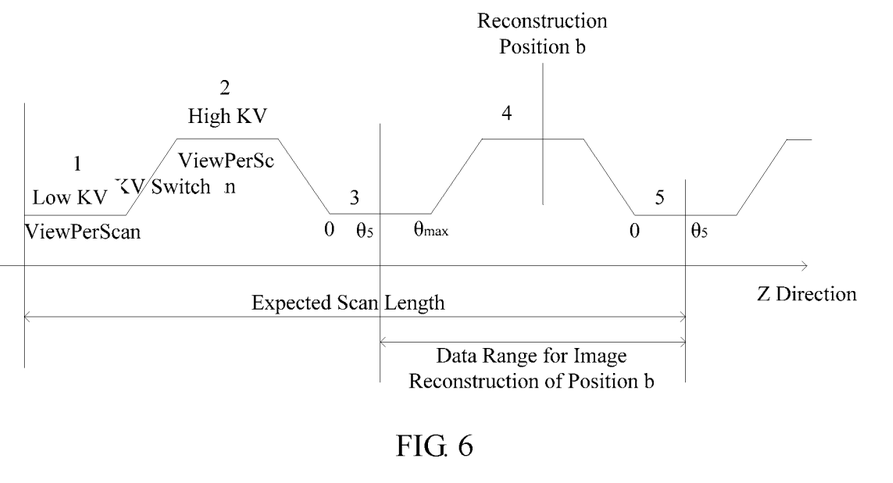
FIG. 6 is a schematic diagram illustrating obtaining image reconstruction data of a reconstruction position according to an example of the present disclosure.

In an example, a scanning angle range of the energy data area 5 is [0, $\theta_5$], where $0<\theta_5<\theta_{max}$, and a scanning angle range of the energy data area 3 is [0, $\theta_{max}$]. A set of projection data for reconstructing the low-energy image of the reconstruction position b is a combination of a set of projection data in the energy data area 5 corresponding to a scanning angle range of [0, $\theta_5$] and a set of projection data in the energy data area 3 corresponding to a scanning angle range of [$\theta_5$, $\theta_{max}$], as shown in FIG. 6.

A set of projection data for reconstructing the low-energy image of the reconstruction position b may be obtained by combining the sets of projection data in two energy data areas.

Methods according to the present disclosure are described above. Devices according to the present disclosure are described below.

Figure 8:
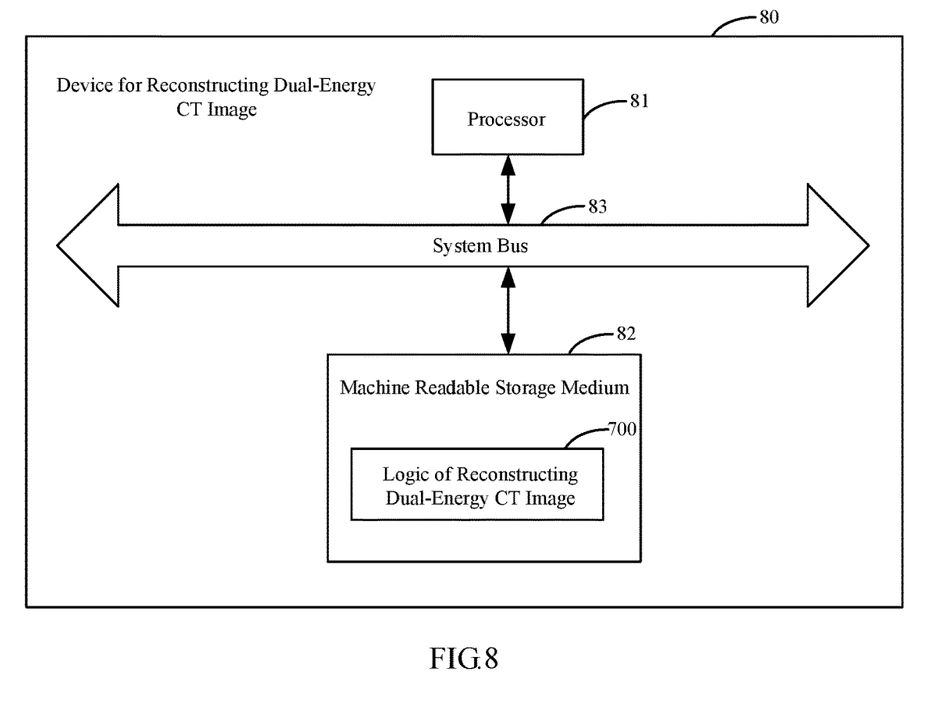
FIG. 8 is a schematic diagram illustrating a structure of a device for reconstructing dual-energy CT images according to an example of the present disclosure.

FIG. 8 schematically illustrates a hardware structure diagram of a device for reconstructing a dual-energy CT image, which is provided by an example of the present disclosure. The device 80 may include a processor 81 and a machine-readable storage medium 82 storing machine executable instructions. The processor 81 may communicate with the machine-readable storage medium 82 via a system bus 83, and execute the method of reconstructing a dual-energy CT image described above by reading and executing the machine executable instructions corresponding to a logic 700 for reconstructing a dual-energy CT image in the machine-readable storage medium 82.

As used herein, the machine-readable storage medium 82 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 7:
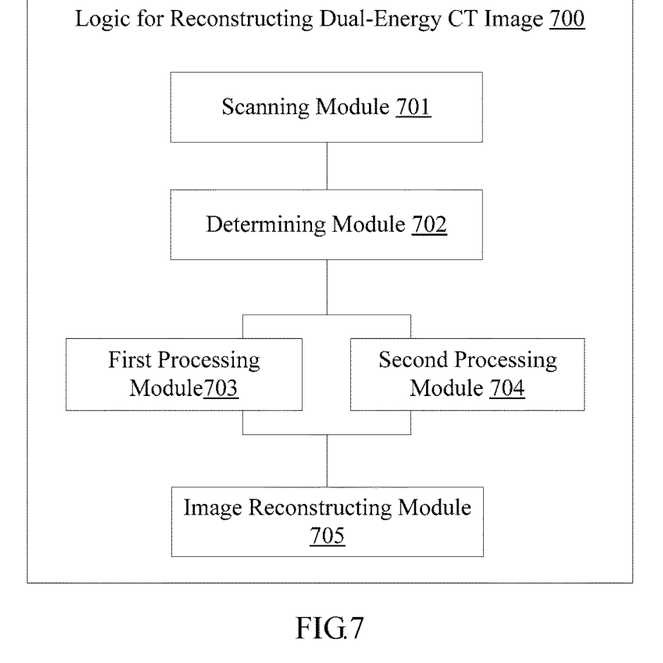
FIG. 7 is a schematic diagram illustrating a hardware structure of logic for reconstructing dual-energy CT images according to an example of the present disclosure.

As shown in FIG. 7, functionally divided, the logic 700 for reconstructing a dual-energy CT image may include modules as follows.

scanning module 701 is configured to perform CT scan with a high energy and a low energy periodically and alternatively changed on a scanning target, and a scanning angle range for each full circle of high-energy scan and a scanning angle range for each full circle of low-energy scan are respectively from 0 to $\theta_{max}$.

In an example, the CT scan is spiral scan, an overlapping part of a circle of high-energy scan and a circle of the low-energy scan adjacent with each other is an energy switching area, and projection data corresponding to the energy switching area is invalid.

In an example, scanning angle ranges corresponding to different energy switching areas are same with each other.

A determining module 702 is configured to determine whether a circle of high-energy scan closest to a current reconstruction position of the scanning target is a full circle of scan.

A first processing module 703 is configured to when the circle of high-energy scan closest to a current reconstruction position of the scanned target is the full circle of scan, obtain a first set of projection data corresponding to the full circle of high-energy scan as reconstruction data for a high-energy image corresponding to the current reconstruction position.

A second processing module 704 is configured to when the circle of high-energy scan closest to the current reconstruction position of the scanned target is not the full circle of scan, obtain a second set of projection data corresponding to a non-full circle of high-energy scan, and a scanning angle range corresponding to the non-full circle of high-energy scan is from 0 to $\theta_{high-end}$, $0<\theta_{high-end}<\theta_{max}$, truncate a third set of projection data corresponding to a scanning angle range from $\theta_{high-end}$ to $\theta_{max}$ from projection data corresponding to a full circle of high-energy scan before the non-full circle of scan; merge the second set of projection data and the third set of projection data as the reconstruction data for the high-energy image of the current reconstruction position.

A image reconstructing module 705 is configured to reconstruct the high-energy image of the current reconstruction position according to the reconstruction data of the high-energy image.

The determining module 702 is further configured to determine whether a circle of low-energy scan closest to a current reconstruction position of the scanning target is a full circle of scan.

The first processing module 703 is further configured to when the circle of low-energy scan closest to a current reconstruction position of the scanned target is the full circle of scan, obtain a fourth set of projection data corresponding to the full circle of low-energy scan as reconstruction data for a low-energy image corresponding to the current reconstruction position.

The second processing module 704 is further configured to when the circle of low-energy scan closest to the current reconstruction position of the scanned target is not the full circle of scan, obtain a fifth set of projection data corresponding to a non-full circle of low-energy scan, and a scanning angle range corresponding to the non-full circle of low-energy scan is from 0 to $\theta_{low-end}$, $0<\theta_{low-end}<\theta_{max}$, truncate a sixth set of projection data corresponding to a scanning angle range from $\theta_{low-end}$ to $\theta_{max}$ from projection data corresponding to a full circle of low-energy scan before the non-full circle of scan; merge the fifth set of projection data and the sixth set of projection data as the reconstruction data for the low-energy image of the current reconstruction position.

The image reconstructing module 705 is further configured to reconstruct the low-energy image of the current reconstruction position according to the reconstruction data of the low-energy image.

In an example, the full circle of high-energy scan corresponding to the second set of projection data and the non-full circle of high-energy scan are spaced by a full circle of low-energy scan when the circle of high-energy scan closest to the current reconstruction position is the non-full circle of high-energy scan; and the full circle of low-energy scan corresponding to the fifth set of projection data and the non-full circle of the low-energy scan are spaced by a full circle of the high-energy scan when the circle of the low-energy scan closest to the current reconstruction position is the non-full circle of low-energy scan.

In an example, the determining module 702 is further configured to determine a circle of high-energy scan passing through the current reconstruction position to be the circle of high-energy scan closest to the current reconstruction position when the high-energy scan is performed on the current reconstruction position.

In an example, the determining module 702 is further configured to when the low-energy scan is not performed on the current reconstruction position, calculate a first distance between the current reconstruction position and a finishing position of a previous circle of low-energy scan adjacent to the circle of high-energy scan passing through the reconstruction position and a second distance between the current reconstruction position and a starting position of a next circle of the low-energy scan adjacent to the circle of high-energy scan passing through the current reconstruction position, respectively; and determine the circle of low-energy scan corresponding to a smaller one of the first distance and the second distance to be the circle of the low-energy scan closest to the current reconstruction position.

In an example, the determining module 702 is further configured to determine a circle of low-energy scan passing through the current reconstruction position to be the circle of low-energy scan closest to the current reconstruction position when the low-energy scan is performed on the current reconstruction position.

In an example, the determining module 702 is further configured to when the high-energy scan is not performed on the current reconstruction position, calculate a third distance between the current reconstruction position and a finishing position of a previous circle of high-energy scan adjacent to the circle of low-energy scan passing through the reconstruction position and a fourth distance between the current reconstruction position and a starting position of a next circle of high-energy scan adjacent to the circle of low-energy scan passing through the current reconstruction position, respectively; and determine the circle of high-energy scan corresponding to a smaller one of the third distance and the fourth distance to be the circle of high-energy scan closest to the current reconstruction position.

According to an example of the present disclosure, CT scan with a high energy and a low energy periodically and alternatively changed is performed on a scanning target, and a scanning angle range for each full circle of high-energy scan and a scanning angle range for each full circle of low-energy scan are respectively from 0 to $\theta_{max}$; it is determined whether a circle of high-energy scan closest to a current reconstruction position of the scanning target is a full circle of scan; when the circle of high-energy scan closest to a current reconstruction position of the scanned target is the full circle of scan, a first set of projection data corresponding to the full circle of high-energy scan is obtained as reconstruction data for a high-energy image corresponding to the current reconstruction position; when the circle of high-energy scan closest to the current reconstruction position of the scanned target is not the full circle of scan, a second set of projection data corresponding to a non-full circle of high-energy scan is obtained, and a scanning angle range corresponding to the non-full circle of high-energy scan is from 0 to $\theta_{high-end}$, $0<\theta_{high-end}<\theta_{max}$, a third set of projection data corresponding to a scanning angle range is truncated from $\theta_{high-end}$ to $\theta_{max}$ from projection data corresponding to a full circle of high-energy scan before the non-full circle of scan, the second set of projection data and the third set of projection data are merged as the reconstruction data for the high-energy image of the current reconstruction position; the high-energy image of the current reconstruction position is reconstructed according to the reconstruction data of the high-energy image; it is determined whether a circle of low-energy scan closest to a current reconstruction position of the scanning target is a full circle of scan; when the circle of low-energy scan closest to a current reconstruction position of the scanned target is the full circle of scan, a fourth set of projection data corresponding to the full circle of low-energy scan is obtained as reconstruction data for a low-energy image corresponding to the current reconstruction position; when the circle of low-energy scan closest to the current reconstruction position of the scanned target is not the full circle of scan, a fifth set of projection data corresponding to a non-full circle of low-energy scan is obtained, and a scanning angle range corresponding to the non-full circle of low-energy scan is from 0 to $\theta_{low-end}$, $0<\theta_{low-end}<\theta_{max}$ a sixth set of projection data corresponding to a scanning angle range from $\theta_{low-end}$ to $\theta_{max}$ is truncated from projection data corresponding to a full circle of low-energy scan before the non-full circle of scan, the fifth set of projection data and the sixth set of projection data are merged as the reconstruction data for the low-energy image of the current reconstruction position; the low-energy image of the current reconstruction position is reconstructed according to the reconstruction data of the low-energy image. Thus, it can be achieved that there is no redundant scan for complete energy image reconstruction, thereby improving safety of a CT scanning device.

The above are merely descriptions of examples of the present disclosure and are not intended to limit the present disclosure. Any modifications, equivalent substitutions, adaptations made without departing from the spirit and scope of the present disclosure shall be encompassed in the scope of protection of the present disclosure.

What is claimed is:

1. A method of reconstructing dual-energy CT images, comprising:

performing a CT scan with a high energy and a low energy periodically and alternatively changed on a scanning target, wherein a scanning angle range for each full circle of high-energy scan and a scanning angle range for each full circle of low-energy scan are respectively from 0 to $\theta_{max}$;

determining whether a circle of high-energy scan closest to a current reconstruction position of the scanning target is a full circle of scan;

when the circle of high-energy scan closest to a current reconstruction position of the scanned target is the full circle of scan, obtaining a first set of projection data corresponding to the full circle of high-energy scan as reconstruction data for a high-energy image corresponding to the current reconstruction position;

when the circle of high-energy scan closest to the current reconstruction position of the scanned target is not the full circle of scan, obtaining a second set of projection data corresponding to a non-full circle of high-energy scan, wherein a scanning angle range corresponding to the non-full circle of high-energy scan is from 0 to $\theta_{high-end}$, $0<\theta_{high-end}<\theta_{max}$, truncating a third set of projection data corresponding to a scanning angle range from $\theta_{high-end}$ to $\theta_{max}$ from projection data corresponding to a full circle of high-energy scan before the non-full circle of scan;

merging the second set of projection data and the third set of projection data as the reconstruction data for the high-energy image of the current reconstruction position;

reconstructing the high-energy image of the current reconstruction position according to the reconstruction data of the high-energy image;

determining whether a circle of low-energy scan closest to a current reconstruction position of the scanning target is a full circle of scan;

when the circle of low-energy scan closest to a current reconstruction position of the scanned target is the full circle of scan, obtaining a fourth set of projection data corresponding to the full circle of low-energy scan as reconstruction data for a low-energy image corresponding to the current reconstruction position;

when the circle of low-energy scan closest to the current reconstruction position of the scanned target is not the full circle of scan, obtaining a fifth set of projection data corresponding to a non-full circle of low-energy scan, wherein a scanning angle range corresponding to the non-full circle of low-energy scan is from 0 to $\theta_{low-end}$, $0<\theta_{low-end}<\theta_{max}$;

truncating a sixth set of projection data corresponding to a scanning angle range from $\theta_{low-end}$ to $\theta_{max}$ from projection data corresponding to a full circle of low-energy scan before the non-full circle of scan;

merging the fifth set of projection data and the sixth set of projection data as the reconstruction data for the low-energy image of the current reconstruction position;

reconstructing the low-energy image of the current reconstruction position according to the reconstruction data of the low-energy image.

2. The method of claim 1, wherein the full circle of high-energy scan corresponding to the second set of projection data and the non-full circle of high-energy scan are spaced by a full circle of low-energy scan when the circle of high-energy scan closest to the current reconstruction position is the non-full circle of high-energy scan; and the full circle of low-energy scan corresponding to the fifth set of projection data and the non-full circle of the low-energy scan are spaced by a full circle of the high-energy scan when the circle of the low-energy scan closest to the current reconstruction position is the non-full circle of low-energy scan.

3. The method of claim 1, further comprising:

determining a circle of high-energy scan passing through the current reconstruction position to be the circle of high-energy scan closest to the current reconstruction position when the high-energy scan is performed on the current reconstruction position.

4. The method of claim 3, further comprising:

when the low-energy scan is not performed on the current reconstruction position,
  calculating a first distance between the current reconstruction position and a finishing position of a previous circle of low-energy scan adjacent to the circle of high-energy scan passing through the reconstruction position and a second distance between the current reconstruction position and a starting position of a next circle of the low-energy scan adjacent to the circle of high-energy scan passing through the current reconstruction position, respectively; and
  determining the circle of low-energy scan corresponding to a smaller one of the first distance and the second distance to be the circle of the low-energy scan closest to the current reconstruction position.

5. The method of claim 1, further comprising:

determining a circle of low-energy scan passing through the current reconstruction position to be the circle of low-energy scan closest to the current reconstruction position when the low-energy scan is performed on the current reconstruction position.

6. The method of claim 5, further comprising:

when the high-energy scan is not performed on the current reconstruction position,
  calculating a third distance between the current reconstruction position and a finishing position of a previous circle of high-energy scan adjacent to the circle of low-energy scan passing through the reconstruction position and a fourth distance between the current reconstruction position and a starting position of a next circle of high-energy scan adjacent to the circle of low-energy scan passing through the current reconstruction position, respectively; and
  determining the circle of high-energy scan corresponding to a smaller one of the third distance and the fourth distance to be the circle of high-energy scan closest to the current reconstruction position.

7. The method of claim 1, wherein the CT scan is spiral scan, an overlapping part of a circle of high-energy scan and a circle of the low-energy scan adjacent with each other is an energy switching area, and projection data corresponding to the energy switching area is invalid.

8. A device for reconstructing a dual-energy CT image, comprising:

a processor, and a non-transitory machine-readable storage medium storing machine executable instructions which are executable by the processor to:

perform CT scan with a high energy and a low energy periodically and alternatively changed on a scanning target, wherein a scanning angle range for each full circle of high-energy scan and a scanning angle range for each full circle of low-energy scan are respectively from 0 to $\theta_{max}$;

determine whether a circle of high-energy scan closest to a current reconstruction position of the scanning target is a full circle of scan;

when the circle of high-energy scan closest to a current reconstruction position of the scanned target is the full circle of scan,
  obtain a first set of projection data corresponding to the full circle of high-energy scan as reconstruction data for a high-energy image corresponding to the current reconstruction position;

when the circle of high-energy scan closest to the current reconstruction position of the scanned target is not the full circle of scan,
  obtain a second set of projection data corresponding to a non-full circle of high-energy scan, wherein a scanning angle range corresponding to the non-full circle of high-energy scan is from 0 to $\theta_{high-end}$, $0<\theta_{high-end}<\theta_{max}$;
  truncate a third set of projection data corresponding to a scanning angle range from $\theta_{high-end}$ to $\theta_{max}$ from projection data corresponding to a full circle of high-energy scan before the non-full circle of scan;
  merge the second set of projection data and the third set of projection data as the reconstruction data for the high-energy image of the current reconstruction position;

reconstruct the high-energy image of the current reconstruction position according to the reconstruction data of the high-energy image;

determine whether a circle of low-energy scan closest to a current reconstruction position of the scanning target is a full circle of scan;

when the circle of low-energy scan closest to a current reconstruction position of the scanned target is the full circle of scan,
  obtain a fourth set of projection data corresponding to the full circle of low-energy scan as reconstruction data for a low-energy image corresponding to the current reconstruction position;

when the circle of low-energy scan closest to the current reconstruction position of the scanned target is not the full circle of scan,
  obtain a fifth set of projection data corresponding to a non-full circle of low-energy scan, wherein a scanning angle range corresponding to the non-full circle of low-energy scan is from 0 to $\theta_{low-end}$, $0 < \theta_{low-end} < \theta_{max}$;

truncate a sixth set of projection data corresponding to a scanning angle range from $\theta_{low-end}$ to $\theta_{max}$ from projection data corresponding to a full circle of low-energy scan before the non-full circle of scan;

merge the fifth set of projection data and the sixth set of projection data as the reconstruction data for the low-energy image of the current reconstruction position;

reconstruct the low-energy image of the current reconstruction position according to the reconstruction data of the low-energy image.

9. The device of claim 8, wherein:

the full circle of high-energy scan corresponding to the second set of projection data and the non-full circle of high-energy scan are spaced by a full circle of low-energy scan when the circle of high-energy scan closest to the current reconstruction position is the non-full circle of high-energy scan; and the full circle of low-energy scan corresponding to the fifth set of projection data and the non-full circle of the low-energy scan are spaced by a full circle of the high-energy scan when the circle of the low-energy scan closest to the current reconstruction position is the non-full circle of low-energy scan.

10. The device of claim 8, wherein the processor is caused by the machine-executable instructions further to:

determine a circle of high-energy scan passing through the current reconstruction position to be the circle of high-energy scan closest to the current reconstruction position when the high-energy scan is performed on the current reconstruction position.

11. The device of claim 10, wherein the processor is caused by the machine-executable instructions further to:

when the low-energy scan is not performed on the current reconstruction position, calculate a first distance between the current reconstruction position and a finishing position of a previous circle of low-energy scan adjacent to the circle of high-energy scan passing through the reconstruction position and a second distance between the current reconstruction position and a starting position of a next circle of the low-energy scan adjacent to the circle of high-energy scan passing through the current reconstruction position, respectively; and determine the circle of low-energy scan corresponding to a smaller one of the first distance and the second distance to be the circle of the low-energy scan closest to the current reconstruction position.

12. The device of claim 8, wherein the processor is caused by the machine-executable instructions further to:

determine a circle of low-energy scan passing through the current reconstruction position to be the circle of low-energy scan closest to the current reconstruction position when the low-energy scan is performed on the current reconstruction position.

13. The device of claim 12, wherein the processor is caused by the machine-executable instructions further to:

when the high-energy scan is not performed on the current reconstruction position, calculate a third distance between the current reconstruction position and a finishing position of a previous circle of high-energy scan adjacent to the circle of low-energy scan passing through the reconstruction position and a fourth distance between the current reconstruction position and a starting position of a next circle of high-energy scan adjacent to the circle of low-energy scan passing through the current reconstruction position, respectively; and determine the circle of high-energy scan corresponding to a smaller one of the third distance and the fourth distance to be the circle of high-energy scan closest to the current reconstruction position.

14. The device of claim 8, wherein the CT scan is spiral scan, an overlapping part of a circle of high-energy scan and a circle of the low-energy scan adjacent with each other is an energy switching area, and projection data corresponding to the energy switching area is invalid.

* * * * *